(12) United States Patent
Yao

(10) Patent No.: US 12,340,045 B2
(45) Date of Patent: Jun. 24, 2025

(54) DISPLAY PANEL AND MOBILE TERMINAL WITH AT LEAST ONE SUB-RECESS

(71) Applicant: Wuhan China Star Optoelectronics Semiconductor Display Technology Co., Ltd., Hubei (CN)

(72) Inventor: Jiaxu Yao, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/623,893

(22) PCT Filed: Dec. 21, 2021

(86) PCT No.: PCT/CN2021/140146
§ 371 (c)(1),
(2) Date: Dec. 30, 2021

(87) PCT Pub. No.: WO2023/108726
PCT Pub. Date: Jun. 22, 2023

(65) Prior Publication Data
US 2024/0427450 A1 Dec. 26, 2024

(30) Foreign Application Priority Data
Dec. 17, 2021 (CN) .......................... 202111552189.1

(51) Int. Cl.
*G06F 3/041* (2006.01)
*G06F 3/044* (2006.01)

(52) U.S. Cl.
CPC .......... *G06F 3/04164* (2019.05); *G06F 3/044* (2013.01)

(58) Field of Classification Search
CPC .... G06F 3/04164; G06F 3/044; G06F 3/0446; G06F 3/0443; G06F 3/0412; G06F 2203/04112
See application file for complete search history.

(56) References Cited

U.S. PATENT DOCUMENTS

| | | | |
|---|---|---|---|
| 2015/0062515 A1 | 3/2015 | Tomioka et al. | |
| 2019/0148467 A1* | 5/2019 | Chung | H10K 50/85 257/40 |

FOREIGN PATENT DOCUMENTS

| | | |
|---|---|---|
| CN | 107180852 | 9/2017 |
| CN | 107783691 | 3/2018 |
| CN | 110196656 | 9/2019 |
| CN | 112181204 | 1/2021 |
| CN | 112186007 | 1/2021 |
| CN | 112670429 | 4/2021 |
| CN | 112820739 | 5/2021 |
| CN | 113571561 | 10/2021 |
| CN | 113725259 | 11/2021 |

* cited by examiner

*Primary Examiner* — Yaron Cohen

(57) ABSTRACT

The present application discloses a display panel and a mobile terminal. The display panel includes a substrate, a light emitting layer, a touch layer, a first refractive index layer, and a second refractive index layer. A refractive index of the second refractive index layer is greater than a refractive index of the first refractive index layer. The touch layer comprises touch wirings extending from a display region to a non-display region. A first type recess in the first refractive index layer covers the touch wirings. The second type recess includes at least one sub-recess not overlapping the touch wirings.

20 Claims, 6 Drawing Sheets

DISPLAY PANEL AND MOBILE TERMINAL WITH AT LEAST ONE SUB-RECESS

RELATED APPLICATIONS

This application is a National Phase of PCT Patent Application No. PCT/CN2021/140146 having International filing date of Dec. 21, 2021, which claims the benefit of priority of Chinese Patent Application No. 202111552189.1 filed on Dec. 17, 2021. The contents of the above applications are all incorporated by reference as if fully set forth herein in their entirety.

FIELD AND BACKGROUND OF THE INVENTION

The present application relates to a field of display technologies, especially to a display panel and a mobile terminal.

At present, to lower a power consumption of an organic light emitting diode (OLED) display panel and improve an efficiency of the OLED display panel, display panel manufacturers constantly set forth new technologies. For example, by geometric optics, a micro lens pattern (MLP) is disposed in an OLED screen body to converge diffused light emitted from the OLED screen body to a place right above a screen body, which is one of effective solutions of improving a light emission rate of the OLED display panel.

However, the micro array pattern in the MLP technology usually needs to be manufactured by an inkjet printing process to make it flat for convenience of later processes. The inkjet printing process requires to set a slit around a periphery of the screen body in advance to block flow of an ink and restrict a coverage of the ink. Because touch wirings and a MLP film layer are disposed adjacent to each other and an overlapped exists between the touch wirings and the slit, over etching occurs when the slit is etched to such that the touch wirings are exposed to result in a technical issue of touch failure.

SUMMARY OF THE INVENTION

Technical Issue

The present application provides a display panel and a mobile terminal to solve a technical issue that touch failure easily occurs in touch wirings in a conventional display panel.

Technical Solution

The present application a display panel, the display panel comprises a display region and a non-display region located on at least one side of the display region; the display panel further comprises:
a substrate;
a light emitting layer disposed on a side of the substrate, wherein the light emitting layer comprises a plurality of light emitting pixels disposed in the display region;
a touch layer disposed on a side of the light emitting layer away from the substrate, wherein the touch layer comprises touch electrodes disposed in the display region and touch wirings electrically connected to the touch electrodes, and the touch wirings extend from the display region to the non-display region;
a first refractive index layer disposed on a side of the touch layer away from the substrate, wherein the first refractive index layer comprises a plurality of first apertures distributed in the display region and corresponding to the light emitting pixels;
a second refractive index layer disposed on a side of the first refractive index layer away from the substrate, filled in the first apertures, and a refractive index of the second refractive index layer is greater than a refractive index of the first refractive index layer;
wherein the first refractive index layer further comprises a plurality of barrier notches distributed in the non-display region and extending along a first direction, the barrier notches comprise a first type recess and a second type recess, the first type recess is disposed to cover the touch wirings, and the second type recess comprises at least one sub-recess not overlapping the touch wirings.

In the display panel of the present application, the display panel further comprises:
a driver circuit layer disposed between the substrate and the light emitting layer, wherein the driver circuit layer comprises a plurality of driver circuits electrically connected to corresponding ones of the light emitting pixels and driver wirings electrically connected to the driver circuits, and the driver wirings extend from the display region to the non-display region;
wherein the non-display region comprises a bending region and a wiring exchange region disposed between the bending region and the display region, wherein the touch wirings are electrically connected to the driver wirings through via holes in the wiring exchange region;
wherein a wiring exchange region is disposed between adjacent two of the sub-recesses.

In the display panel of the present application, an overlapped position between the first type recess and the touch wirings are filled with a covering portion.

In the display panel of the present application, the covering portion comprises a plurality of sub-covering portions at least covering one of the touch wirings.

In the display panel of the present application, a plurality of barrier sets are disposed in at least one of the barrier notches and are arranged along a second direction, and each of the barrier sets comprises a plurality of barrier bodies arranged along the first direction;
wherein the barrier bodies in adjacent two of the barrier sets are staggered, and an included angle range between the first direction and the second direction is 0° to 90°.

In the display panel of the present application, along a direction of a top view of the display panel, a shape of the barrier body is at least one of a square, a rhombus, or a circle.

In the display panel of the present application, in adjacent two of the barrier sets, a central interval between adjacent two of the barrier bodies is 6 microns to 9 microns;
wherein a length of a diagonal line of the barrier bodies is 8 microns to 12 microns.

In the display panel of the present application, along the second direction, a size of each of the barrier notches is equal, and an interval between adjacent two of the barrier notches is equal.

In the display panel of the present application, along the second direction, a size of each of the barrier notches is 40 microns, and an interval between adjacent two of the barrier notches is 40 microns.

In the display panel of the present application, along the second direction, a size of each of the barrier notches is greater than a size of the first aperture.

In the display panel of the present application, the first type recess comprises a first recess and a second recess, the second type recess comprises the two sub-recesses separated from each other, the second recess is located between the first recess and the sub-recesses, the sub-recesses are located on a side of the second recess away from the display region, and the first recess is located on a side of the second recess near the display region;

wherein a boundary of the second refractive index layer is located between the first apertures and the first recess; or, a boundary of the second refractive index layer is located between the first recess and the second recess; or, a boundary of the second refractive index layer is located between the sub-recesses and the second recess.

In the display panel of the present application, along the first direction, a size of each of the sub-recesses is 1000 microns to 2000 microns.

In the display panel of the present application, the first recess or the second recess comprises a first barrier segment and a second barrier segment, the first barrier segment is perpendicular to the second barrier segment, and an extension direction of the first barrier segment is parallel to the first direction;

wherein along the first direction, an interval between the second barrier segment and the sub-recesses is 1000 microns to 2000 microns.

In the display panel of the present application, the first type recess is disposed between the display region and a bending region;

wherein two ends of the first type recess extend to a boundary of the display panel and contacts the boundary of the display panel.

The present application also provides a mobile terminal, wherein the mobile terminal comprises a terminal main body and the above display panel, and the terminal main body and the display panel are assembled integrally.

Advantages

The present application disposes at least one sub-recess, not overlapping touch wirings, on a side away from the display region to reduce an overlapped region between barrier notches and the touch wirings and mitigate the technical issue of failure of the touch wirings due to over etching of the barrier notches.

DESCRIPTION OF SPECIFIC EMBODIMENTS OF THE INVENTION

To make the objective, the technical solution, and the effect of the present application clearer and more explicit, the present application will be further described in detail below with reference to the accompanying drawings. It should be understood that the specific embodiments described here are only used to explain the present application instead of being used to limit the present application.

Figure 1:
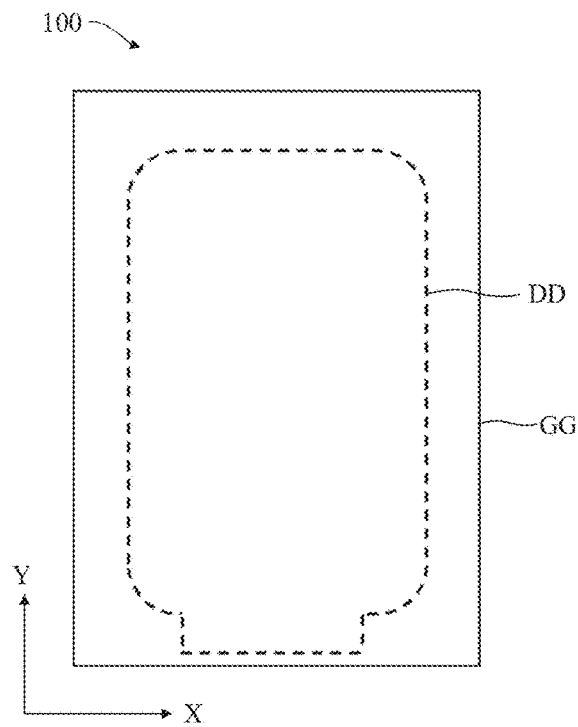
FIG. 1 is a first structural top view of a conventional display panel.

With reference to FIG. 1, a square structure in FIG. 1 is a structure before a display panel is cut. An outer solid line of the square structure is a first cutting line GG. An inner broken line of the square structure in FIG. 1 is a second cutting line DD. The first cutting line GG is a cutting line formed by cutting a motherboard into the square structure. The second cutting line DD is a target shape of a display panel to be cut.

Figure 2:
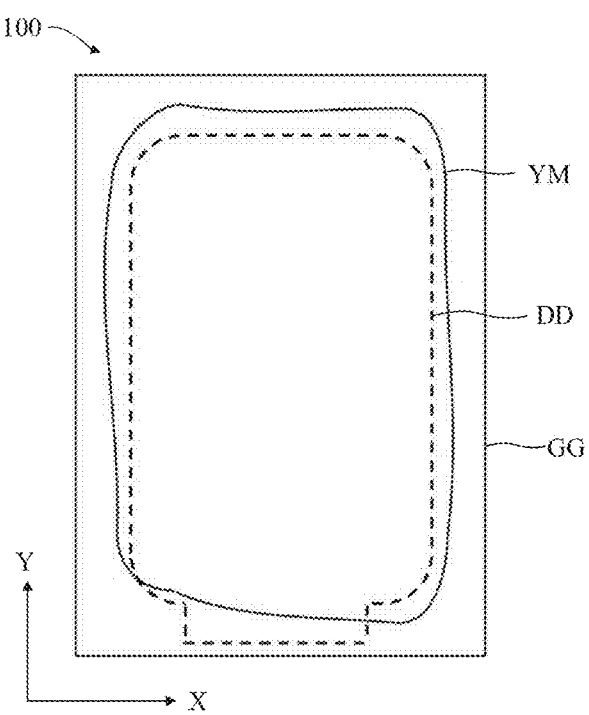
FIG. 2 is a second structural top view of the conventional display panel.
Figure 3:
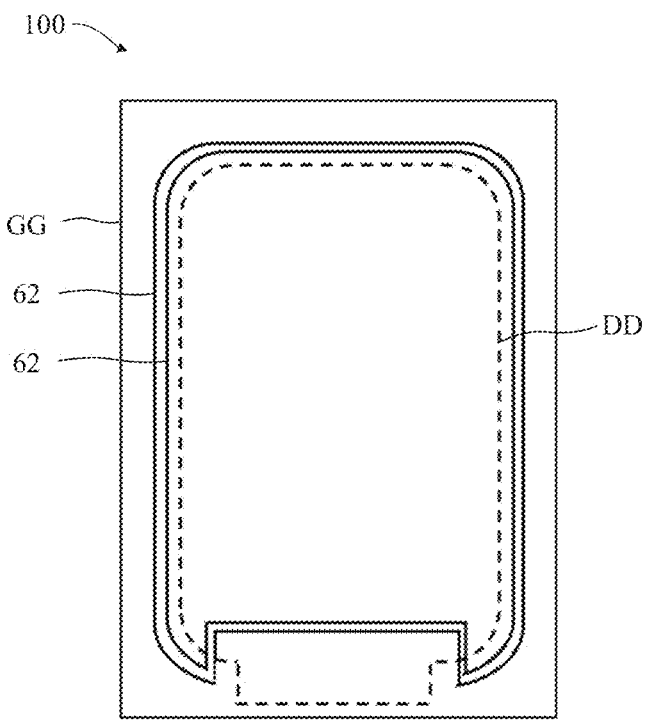
FIG. 3 is a third structural top view of the conventional display panel.

With reference to FIG. 2, a micro array pattern in a MLP technology is usually required to be manufactured by an inkjet printing process. An irregular solid line in the square structure in FIG. 2 is an irregular boundary YM of an oil ink. With reference to FIG. 3, for controlling a boundary of the oil ink, at present, usually a plurality of barrier notches 62 are defined in an outer periphery of display panel. However, because a structure of a lower boundary is different from structures of three other boundaries, a current barrier structure probably overlaps vertically disposed touch wirings. Therefore, over etching occurs when the barrier notches 62 are etched such that the touch wirings are exposed to result in a of technical issue of touch failure. Thus, the present application sets forth a display panel to solve the above technical issue.

With reference to FIGS. 4 to 11, the present application provides a display panel 100. The display panel 100 comprises a display region 200 and a non-display region 300 located on at least one side of the display region 200.

In the present embodiment, the display panel 100 can further comprise a substrate 10, a light emitting layer 30, a touch layer 50, a first refractive index layer 60, and a second refractive index layer 70.

In the present embodiment, the light emitting layer 30 is disposed on a side of the substrate 10. The light emitting layer 30 comprises a plurality of light emitting pixels disposed in the display region 200. The first refractive index layer 60 is disposed on a side of the light emitting layer 30. The first refractive index layer 60 comprises a plurality of first apertures distributed in the display region 200 and corresponding to the light emitting pixels 61. The second refractive index layer 70 is disposed on a side of the first refractive index layer 60 away from the substrate 10 and is filled in the first apertures 61. A refractive index of the second refractive index layer 70 is greater than a refractive index of the first refractive index layer 60.

In the present embodiment, the touch layer 50 is disposed on a side of the light emitting layer 30 away from the substrate 10. The touch layer 50 comprises touch electrodes disposed in the display region 200 and touch wirings 51 electrically connected to the touch electrodes. The touch wirings 51 extend from the display region 200 to the non-display region 300.

In the present embodiment, the first refractive index layer 60 further comprises a plurality of barrier notches 62 distributed in the non-display region 300 and extending along a first direction X. The barrier notches 62 comprises a first type recess D1 and a second type recess D2. The first type recess D1 covers the touch wirings 51. The second type recess D2 comprises at least one sub-recess 623 not overlapping the touch wirings 51.

The present application disposes at least one sub-recess 623 on a side of away from the display region 200 not overlapping the touch wirings 51 to reduce a contact area between the barrier notches 62 and the touch wirings 51, which mitigates the technical issue of failure of the touch wirings 51 resulting from the over etched barrier notches 62.

Now technology solutions of the present application are described with specific embodiments.

Figure 4:
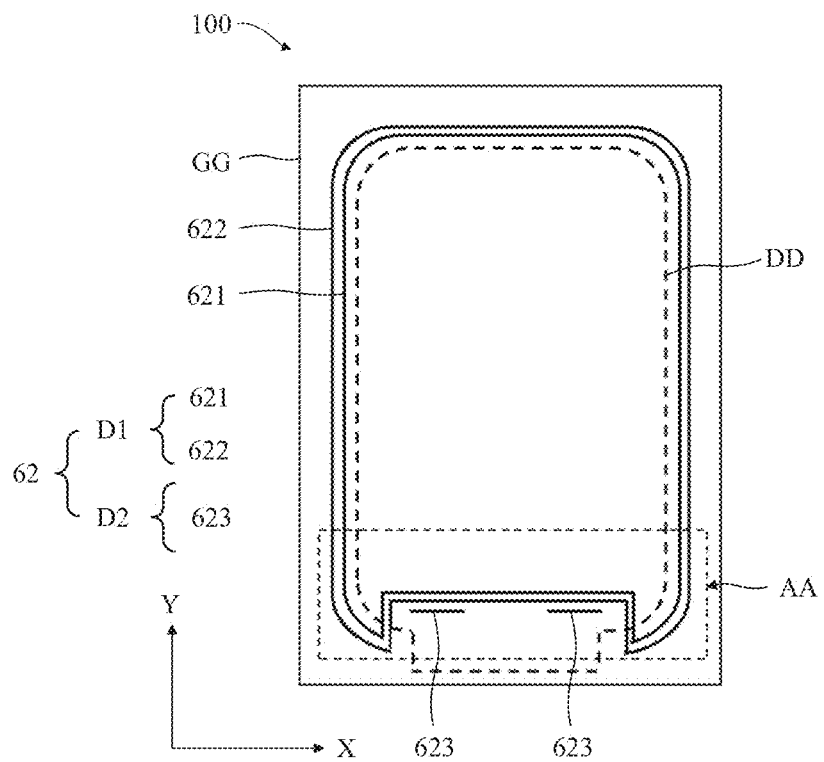
FIG. 4 is a first structural top view of the display panel of the present application.

With reference to FIG. 4, the display panel 100 can comprise a display region 200 and a non-display region 300 located on at least one side of the display region 200. It should be explained that the non-display region 300 can be a lower frame region of the display panel 100.

Figure 5:
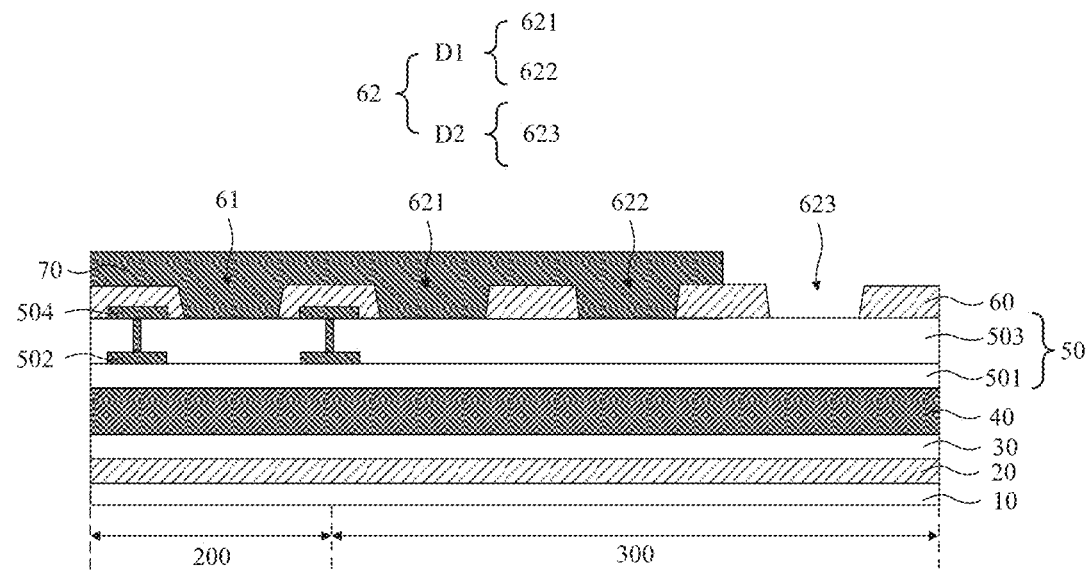
FIG. 5 is a first structural cross-sectional view of the display panel of the present application.
Figure 6:
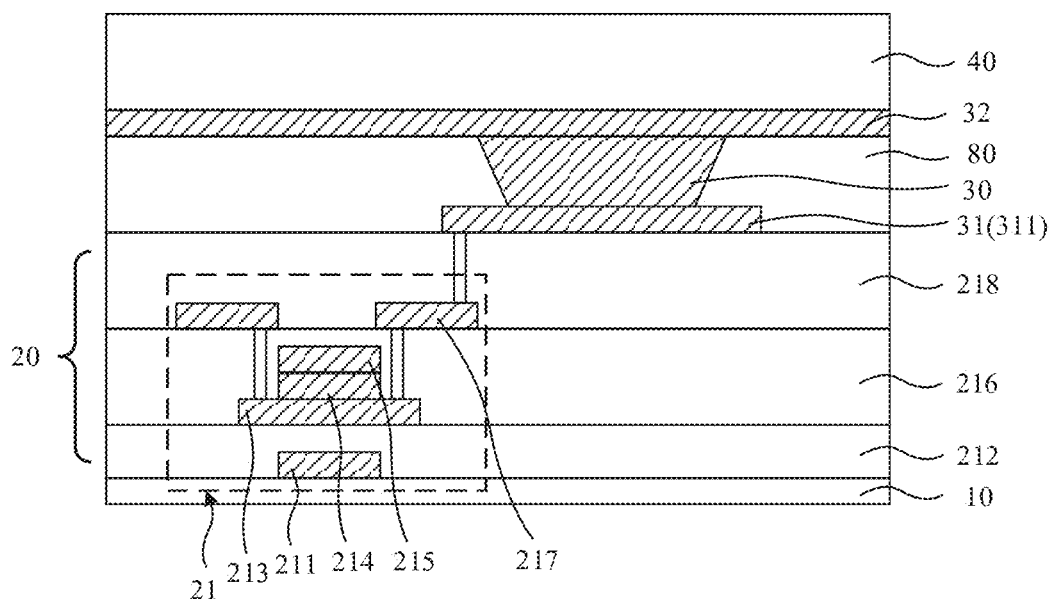
FIG. 6 is a structural view of film layers of the display panel of the present application.

With reference to FIGS. 5 and 6, the display panel 100 can comprise a driver circuit layer 20 disposed on the substrate 10, a pixel definition layer 80 disposed on the driver circuit layer 20, the light emitting layer 30 disposed in the same layer with the pixel definition layer 80, an encapsulation layer 40 disposed on the pixel definition layer 80, a touch layer 50 disposed on the encapsulation layer 40, the first refractive index layer 60 disposed on the touch layer 50, and the second refractive index layer 70 disposed on the first refractive index layer 60.

In the present embodiment, a material of the substrate 10 can be a material such as glass, quartz, or polyimide.

In the present embodiment, with reference to FIG. 6, the driver circuit layer 20 can comprise a plurality of thin film transistors 21, the thin film transistors 21 can be etching barrier type, rear channel etching type, or can according to positions of a gate electrode and an active layer be divided into structures such as bottom gate thin film transistors, top gate thin film transistors, and have no specific limit therefor. For example, the thin film transistors 21 shown in FIG. 6 are top gate type thin film transistors, the thin film transistors 21 can comprise a light shielding layer 211 disposed on the substrate 10, a buffer layer 212 disposed on the light shielding layer 211, an active layer 213 disposed on the buffer layer 212, a gate insulation layer 214 disposed on the active layer 213, a gate electrode layer 215 disposed on the gate insulation layer 214, an interlayer insulation layer 216 disposed on the gate electrode layer 215, a source and drain electrode layer 217 disposed on the interlayer insulation layer 216, and a planarization layer 218 disposed on the source and drain electrode layer 217.

In the present embodiment, with reference to FIG. 5, the display panel 100 can further comprise an anode layer 31 disposed on the planarization layer 218, a light emitting layer 30 disposed on the anode layer 31, and a cathode layer 32 disposed on the light emitting layer 30. The anode layer 31 comprises a plurality of anodes 311, the pixel definition layer 80 comprises a plurality of pixel apertures corresponding to the anodes 311, and each of the pixel apertures exposes an upper surface of a corresponding one of the anodes 311. The light emitting layer 30 can comprise a plurality of light emitting pixels corresponding to the anodes 311.

In the present embodiment, with reference to FIG. 5, the encapsulation layer 40 covers the pixel definition layer 80, and continuously covers a plurality of pixel apertures and the light emitting pixels. The encapsulation layer 40 can at least comprise a first inorganic encapsulation layer, a first organic encapsulation layer, and a second inorganic encapsulation layer stacked on the pixel definition layer 80.

In the present embodiment, with reference to FIG. 5, the touch layer 50 can comprise a first touch metal layer 502 and a second touch metal layer 504 disposed on the encapsulation layer 40, and an insulation layer disposed between the first touch metal layer 502 and the second touch metal layer 504.

In the present embodiment, the touch layer 50 provided by the embodiment of the present application can be mutual capacitive or self-capacitive.

In the present embodiment, when the touch layer 50 is mutual capacitive, then the first touch metal layer 502 can comprise a plurality of first electrodes and a plurality of second electrodes. The first electrodes are connected through first connection bridges in the first touch metal layer 502. The second electrodes are connected through second connection bridges extending through the insulation layer in the second touch metal layer 504. When the touch layer 50 is self-capacitive, the first touch metal layer 502 can comprise a plurality of touch electrodes distributed in an array, and the second touch metal layer 504 can comprise a plurality of touch wirings 51, and the touch wirings 51 are connected correspondingly to the touch electrodes.

In the present embodiment, when the touch layer 50 is self-capacitive, the touch layer 50 can only comprise one metal layer. Namely, the metal layer comprises a plurality of touch electrodes and a plurality of touch wirings 51 located among adjacent ones of the touch electrodes, and the touch wirings 51 are connected correspondingly to the touch electrodes. Furthermore, the embodiment of the present application are only examples as described above but it not limited thereto. Specific types structures of the touch layer 50 can be selected according to actual demands.

In the present embodiment, with reference to FIG. 5, the first refractive index layer 60 can be disposed on the touch layer 50, and the first refractive index layer 60 covers the display region 200 of the display panel 100 and extends to the non-display region 300. The first refractive index layer 60 can comprise a plurality of first apertures 61 formed in the display region 200, a position below each of the first apertures 61 corresponds to one of the pixel apertures, namely, the first apertures 61 corresponds to the light emitting pixels, and cross-section of the first apertures 61 can be inverted-trapezoidal.

In the present embodiment, the first refractive index layer 60 can further comprise at least one of the barrier notches 62 in the non-display region 300. Each of the barrier notches 62 comprises the barrier bodies 63, and a number of the barrier notches 62 can be one, two, three, or more. Each of the barrier notches 62 is configured to prevent the second refractive index layer 70 from spreading toward non-display region 300.

In the present embodiment, with reference to FIG. 5, the second refractive index layer 70 can be disposed on the first refractive index layer 60, and the second refractive index layer 70 also covers display region 200 and extends to the non-display region 300. The second refractive index layer 70 is filled in the first apertures 61 to form a plurality of micro lens units in the first apertures 61 to further perform a light convergence effect to the light emitting pixels corresponding to micro lens units and improve light emission effect of the corresponding light emitting pixels to further enhance a light emission rate of the display panel 100.

In the present embodiment, the second refractive index layer 70 is also spread to the non-display region 300, and is filled in at least some of the barrier bodies 63 in the barrier notches 62.

In the present embodiment, the refractive index of the second refractive index layer 70 can be greater than the refractive index of the first refractive index layer 60. Light of a large angle emitted from the light emitting pixels enters the first apertures 61 in the first refractive index layer 60 through the encapsulation layer 40, and then enters an interface between the first refractive index layer 60 and the second refractive index layer 70. Because the refractive index of the second refractive index layer 70 is greater than the refractive index of the first refractive index layer 60, the light of a large angle entering the interface between the first refractive index layer 60 and the second refractive index layer 70 would undergo a total reflection to achieve a light convergence effect corresponding to the light emitting pixels, improve a light emission effect of corresponding light emitting pixels to further enhance a light emission rate of the display panel 100.

In the present embodiment, one of the first apertures 61 in the first refractive index layer 60 forms a micro structure with a light converging effect.

In the present embodiment, a material of the first refractive index layer 60 and the second refractive index layer 70 can be a high light transmissive material, and a transmittance thereof is generally required to be greater than 90%. Namely, the transmittance of the first refractive index layer 60 and the second refractive index layer 70 is far greater than a transmittance of a general polarizer (42%). Disposing a material with a high transmittance for replacing the polarizer can effectively improve a light emission rate of the display panel 100.

In the present embodiment, a refractive index of the first refractive index layer 60 can be 1.4 to 1.6, and a material of the first refractive index layer 60 can comprise a light transmissive organic material with a low refractive index. For example, a material of the first refractive index layer 60 can be acrylic acid resin, polyimide resin, polyamide resin and/or Alq3[Tris (8-hydroxyquinolinato) aluminum], etc.

In the present embodiment, a refractive index of the second refractive index layer 70 can be 1.61 to 1.8, and a material of the second refractive index layer 70 can comprise a light transmissive organic material including a high refractive index. For example, a material of the second refractive index layer 70 can be Poly (3,4-ethylenedioxy-thiophene) (PEDOT), 4,4'-Bis [N-(3-methylphenyl)-N-phenylamino]biphenyl (TPD), 4,4',4"-Tris (N-3-methylphenyl-N-phenylamino) triphenylamine (m-MTDATA), 1,3,5-tris [N,N-bis (2-methylphenyl)-amino]-benzene (o-MTDAB), 1,3,5-tris [N,N-bis (3-methylphenyl)-amino]-benzene (m-MTDAB), 1,3,5-tris [N,N-bis (4-methylphenyl)-amino]-benzene (p-MTDAB), 4,4'-bis [N,N-bis (3-methylphenyl)-amino]-diphenylmethane (BPPM), 4,4'-N,N'-dicarbazol-biphenyl (CBP), 4'4',4"-tris (carbazol-9-yl)-triphenylamine (TCTA), 2,2',2"-(1,3,5-phenylene) tris-[1-phenyl-1H-benzimidazole] (TPBI), and 3-(4-biphenyl)-4-phenyl-5-tert-butylphenyl-1,2,4-triazole (TAZ).

In the display panel 100 of the present application, because a structure of the lower boundary is different from structures of other three boundaries, the current barrier structure cannot fulfill control of an oil ink on the cutoff boundary of the lower boundary. Therefore, the present application patterns the barrier notches 62 near lower frame region, namely, a regular hollowed and continuous recess is replaced with the barrier bodies 63 of the present application.

Figure 7:
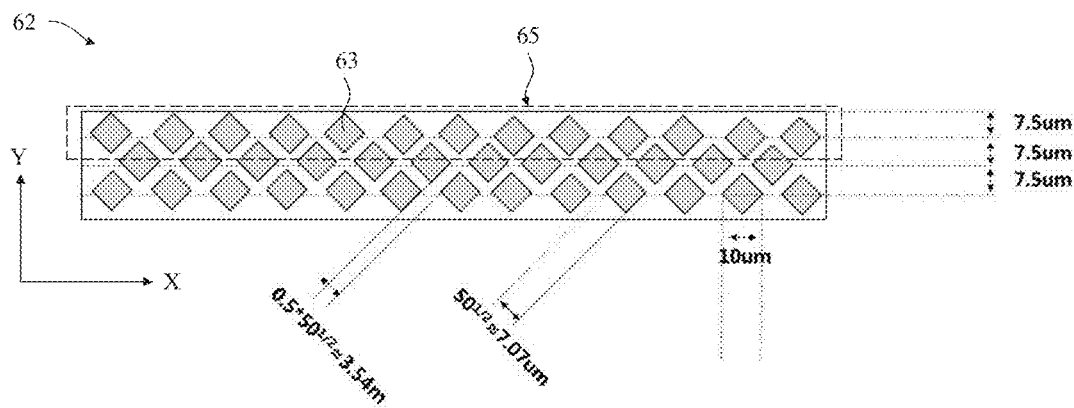
FIG. 7 is an enlarged view of barrier notches of the display panel of the present application.

With reference to FIG. 4, the barrier notches 62 in a region AA of FIG. 4 requires a new design. With reference to FIG. 7, FIG. 7 is a schematic view of one barrier notch 62 in a plurality of barrier notches 62. A plurality of barrier sets 65 along a second direction Y are disposed in the barrier notches 62. Each of the barrier sets 65 comprises the barrier bodies 63 disposed along the first direction X. The barrier bodies 63 in adjacent two of the barrier sets 65 are staggered, and an included angle range between the first direction X and the second direction Y is 0 to 90.

In the present embodiment, the first direction X can be the extension direction of the barrier notches 62 and can be parallel to a lower frame of the display panel 100. The second direction Y can be a direction from the display region 200 to the non-display region 300, namely, the first direction X can be perpendicular to the second direction Y.

In the present embodiment, the barrier bodies 63 are arranged along the first direction X and the second direction Y, and the barrier bodies 63 of adjacent two rows are staggered. An interval between adjacent two of the barrier bodies 63 in one barrier set 65 is less than a size of the barrier bodies 63 along the first direction X.

In the present embodiment, the barrier bodies 63 can be protrusion structures disposed in the barrier notches 62. For example, when the barrier notches 62 are etched and hollowed, some of protrusion structures are retained to increase a contact area between the second refractive index material and the barrier notches 62 to further improve a surface tension of the second refractive index material. Furthermore, the barrier bodies 63 can also be aperture structures defined in the barrier notches 62, for example, a film layer structure that a recess depth formed by the barrier notches 62 not etched to the touch layer 50 such that holes are defined one the basis of the film layer to increase a contact area between the second refractive index material and the barrier notches 62 to further improve a surface tension of the second refractive index material.

In the present embodiment, when the barrier bodies 63 are protrusion structures, a depth of each of the barrier bodies 63 is the same as a thickness of the first refractive index layer 60. When the barrier bodies 63 is an aperture structure, a sum of the depth of each of the barrier bodies 63 and the depth of the barrier notch is the same as the thickness of the first refractive index layer 60.

The present embodiment replaces a continuous recess hollowed in the first refractive index layer 60 with a plurality of non-continuous barrier bodies 63 to increase the contact area between the second refractive index layer 70 and the first refractive index layer 60 to further increase a surface tension of the second refractive index layer 70 and reduce an expansion force of the second refractive index layer 70 toward the non-display region 300, which effectively controls the boundary of the second refractive index layer 70 and saves a space of the non-display region 300 to achieve narrow frame display.

In the display panel 100 of the present application, along a direction of a top view of the display panel 100, a shape of the barrier body 63 is at least one of a square, a rhombus, or a circle.

With reference to FIG. 7, a shape of the barrier bodies 63 can be a square rotating by 45°.

In the present embodiment, when the second refractive index layer 70 spreads from the display region 200 of the display panel 100 to the non-display region 300, the second refractive index layer 70 would pass through at least some of the barrier bodies 63. Because the barrier bodies 63 is a square rotating by 45°, an included angle is defined between a flowing direction of the second refractive index layer 70 and the boundary of the barrier bodies 63, and more resistance points exist, which can increase a resistance force of the barrier bodies 63 to the second refractive index layer 70.

In the present embodiment, although a regular square can also effectively control the cutoff boundary of the second refractive index layer 70, compared to the solution in FIG. 7, the regular square has two boundaries parallel to the flowing direction of the second refractive index layer 70, and its resistance force to the second refractive index layer 70 is less than that of the solution in FIG. 7.

In the display panel 100 of the present application, considering a size of the barrier notches 62 and a number of the barrier bodies 63, in adjacent two of the barrier sets 65, an interval of a central point of adjacent two of the barrier bodies 63 can be 6 microns to 9 microns, each of the barrier bodies 63 的 a length of a diagonal line is 8 microns to 12 microns.

With reference to FIG. 7, a square rotating by 45° is taken as an example, a size of two diagonal lines of the barrier bodies 63 can be 10 microns, a size of any edge of the barrier bodies 63 is 7.07 microns.

In the present embodiment, with reference to FIG. 7, in the different barrier sets 65, an interval of adjacent two of the barrier bodies 63 can be half a side length of the barrier bodies 63, i.e., 3.54 microns. Second, in adjacent two of the barrier sets 65, an interval of a central point of adjacent two of the barrier bodies 63 along the second direction Y can be 7.5 microns.

In the present embodiment, a size of the barrier notches 62 along the second direction Y can be 40 microns.

In the display panel 100 of the present application, a structure shown in FIG. 4 is taken as an example, the first refractive index layer 60 can comprise two the first type recesses D1 and one second type recess D2. The two first type recesses D1 can be a first recess 621 and a second recess 622. The second type recess D2 can comprise two sub-recesses 623. The second recess 622 is located between the first recess 621 and the sub-recesses 623, the sub-recesses 623 are located on a side of the second recess 622 away from the display region 200, and the first recess 621 is located on a side of the second recess 622 near the display region 200.

Figure 8:
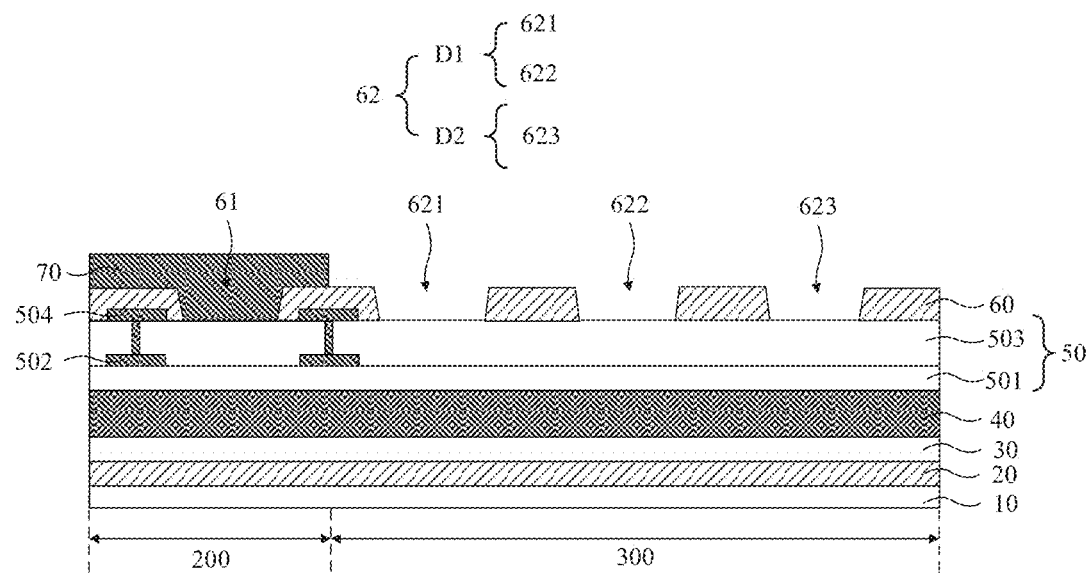
FIG. 8 is a second structural cross-sectional view of the display panel of the present application.

With reference to FIG. 8, the cutoff boundary of the second refractive index layer 70 is located between the first apertures 61 and the first recess 621. When the second refractive index 70 extends toward the first recess 621, probably due to a sufficient surface tension of the second refractive index 70 itself, the second refractive index 70 does not cover the first recess 621 such that the cutoff boundary of the second refractive index 70 is located between the first recess 621 and the display region 200.

Figure 9:
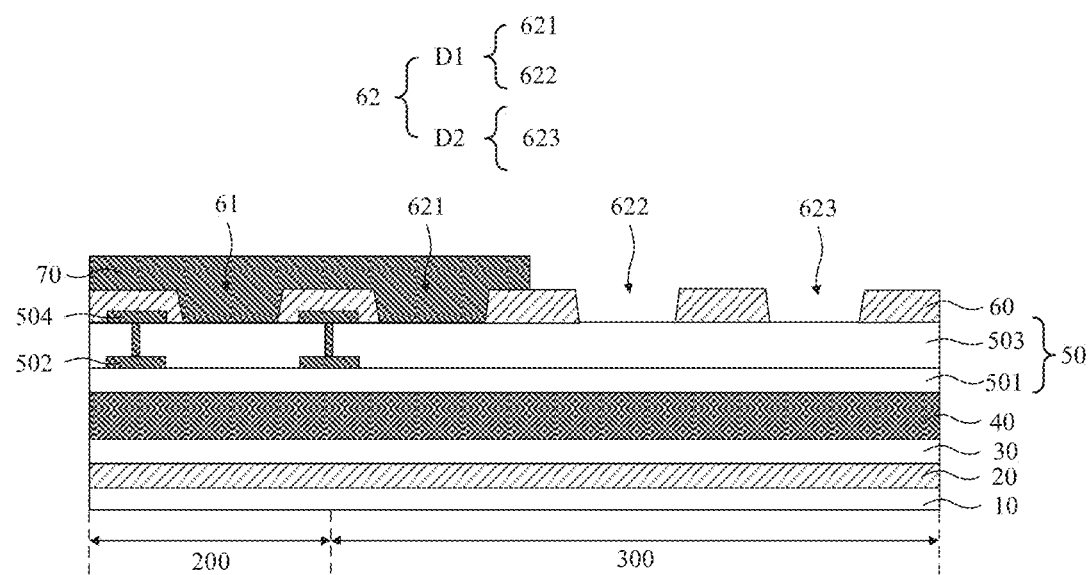
FIG. 9 is a third structural cross-sectional view of the display panel of the present application.

With reference to FIG. 9, the cutoff boundary of the second refractive index 70 can be located between the second recess 622 and the first recess 621. When the second refractive index 70 extends toward the second recess 622, probably due to a barrier function of the first recess 621 and a sufficient surface tension of the second refractive index 70 itself, the second refractive index 70 does not cover the second recess 622 such that the cutoff boundary of the second refractive index 70 is located between the first recess 621 and the second recess 622.

With reference to FIG. 5, the cutoff boundary of the second refractive index layer 70 can be located between the sub-recess 623 and the second recess 622. When the second refractive index layer 70 extends toward the sub-recess 623, probably due to a barrier function of the second recess 622 and a sufficient surface tension of the second refractive index layer 70 itself, the second refractive index layer 70 does not cover the second recess 622 such that the cutoff boundary of the second refractive index layer 70 is located between the sub-recess 623 and the second recess 622.

Furthermore, the second refractive index layer 70 can also cover the sub-recess 623 and extend along a direction away from the sub-recess 623.

In the present embodiment, to prevent the second refractive index layer 70 from further extending along a direction away from the display region 200 in the display panel 100 after crossing the second recess 622, and failing to effectively controlling the cutoff boundary of the second refractive index layer 70, the sub-recess 623 is also disposed on a side of the second recess 622 away from the display region 200. The sub-recess 623 can comprise a plurality of non-continuous the barrier bodies 63.

In the present embodiment, the barrier bodies 63 in the first recess 621, the second recess 622, and the sub-recess 623 cooperatively function to further increase a surface tension of the second refractive index layer 70 and reduce an expansion force of the second refractive index layer 70 toward the non-display region 300 such that the cutoff boundary of the second refractive index is effectively controlled.

In the present embodiment, along the first direction X, a size C of each of the sub-recess 623 can be 1000 microns to 2000 microns.

Figure 10:
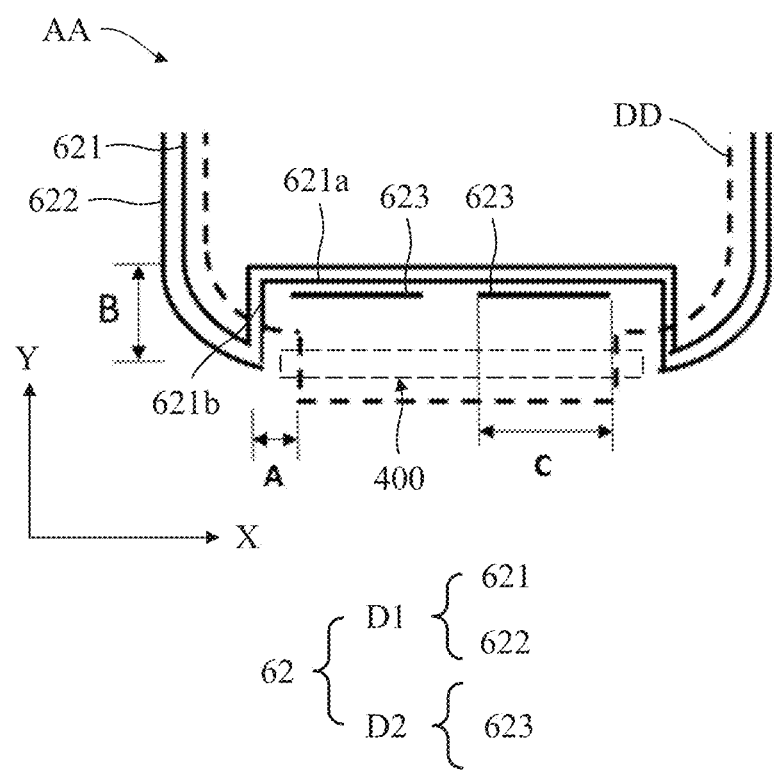
FIG. 10 is a first enlarged view of a region AA in FIG. 4.

In the present embodiment, with reference to FIG. 10, along the first direction X, the size C of each of the sub-recess 623 can be 2000 microns.

In the display panel 100 of the present application, with reference to FIG. 10, the first recess 621 or the second recess 622 comprises a first barrier segment 621a and a second barrier segment 621b. The first barrier segment 621a is perpendicular to the second barrier segment 621b. An extension direction of the first barrier segment 621a is parallel to the first direction X. The structure in FIG. 10 marks the second recess 622 as an example.

In the present embodiment, along the first direction X, a first interval A between the second barrier segment 621b and the sub-recess 623 is 1000 microns to 2000 microns.

In the present embodiment, with reference to FIG. 10, the first interval A can be 2000 microns.

With reference to FIG. 10, because the broken line in FIG. 10 is a second cutting line DD, namely, a region enclosed by the second cutting line DD is a final shape of the display panel 100, a structure outside the broken line will no longer exist in the final product. However, a second interval B between the first barrier segment 621a in the first recess 621 and a corner region is generally set as 300 microns to 500 microns.

In the present embodiment, with reference to FIG. 10, the second interval B can be 500 microns.

Figure 11:
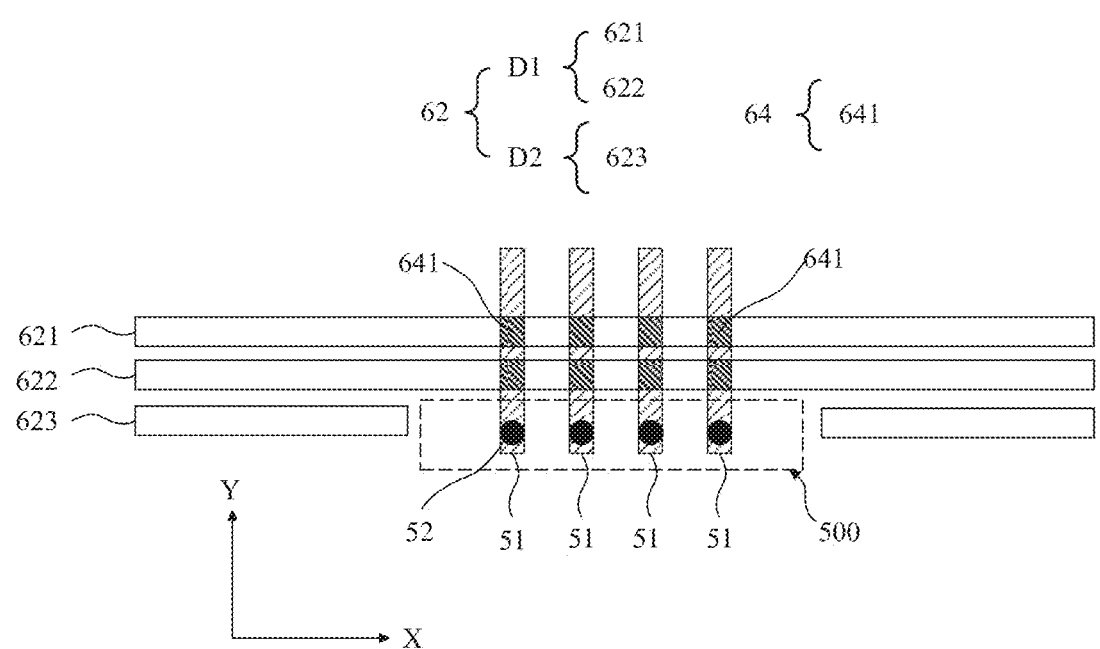
FIG. 11 is a second enlarged view of the region AA in FIG. 4.

In the display panel 100 of the present application, with reference to FIGS. 5 and 11, the touch layer 50 can be disposed between the encapsulation layer 40 and the first refractive index layer 60. The touch layer 50 comprises a plurality of touch wirings 51 extending from the display region 200 to the non-display region 300. The touch wirings 51 comprises a plurality of overlapping portions overlapping at least one of the barrier notches 62.

In the present embodiment, with reference to FIG. 5, the touch layer 50 can comprise a first insulation layer 501 disposed on the encapsulation layer 40, a first touch metal layer 502 disposed on the first insulation layer 501, a second insulation layer 503 disposed on the first touch metal layer 502, and a second touch metal layer 504 disposed on the second insulation layer 503. The second insulation layer 503 covers the first touch metal layer 502. The first refractive index layer 60 covers the second touch metal layer 504. In FIG. 11, when the touch wirings 51 extend from the display region 200 to the non-display region 300, the touch wirings 51 would cross the first recess 621 or/and the second recess 622. Therefore, a covering portion 64 is filled in an overlapped position between the touch wirings 51 and the first type recess D1.

In the present embodiment, the covering portion 64 can be a material of the first refractive index layer 60 not etched.

With reference to FIG. 11, the covering portion 64 comprises a plurality of sub-covering portions 641 at least covering one of the touch wirings 51. In the present embodiment, one sub-covering portion 641 covers one touch wiring 51, and the barrier bodies 63 can be disposed between adjacent two of the sub-covering portions 641.

With reference to FIGS. 5 and 11, because the first refractive index layer 60 covers the second touch metal layer 504, when the touch wirings 51 is the second touch metal layer 504, the barrier bodies 63 would interfere with the touch wirings 51. Therefore, to prevent interference of both, the present application disposes sub-covering portions 641 corresponding to the touch wirings 51 in the first recess 621 or/and the second recess 622. The sub-covering portions 641 on the first recess 621 or/and the second recess 622 have no barrier bodies 63, which prevent interference of the barrier bodies 63 with touch wirings 51.

In the present embodiment, when the touch wirings 51 is the first touch metal layer 502, because a thickness of the second insulation layer 503 is thinner, a risk of over etching easily occurs when the first refractive index layer 60 is etched to form the barrier bodies 63.

The present embodiment employs a design of omitting barrier bodies 63 in regions overlapping the touch wirings 51 to prevent interference with the touch wirings 51 during etching the barrier bodies 63, which avoids the technical issue of over etching the touch wirings 51.

In the present embodiment, the driver circuit layer 20 can further comprise a plurality of driver circuits electrically connected to corresponding ones of the light emitting pixels and driver wirings electrically connected to the driver circuits. The driver wirings extend from the display region 200 to the non-display region 300. The non-display region 300 comprises a bending region 400 and a wiring exchange region 500 disposed between the bending region 400 and the display region 200. The touch wirings 51 are electrically connected to the driver wirings through via holes 52 in the wiring exchange region 500, one wiring exchange region 500 is disposed between adjacent two of the sub-recesses 623.

With reference to FIG. 11, the touch wirings 51 extending from the display region 200 to the non-display region 300. To reduce touch driver chips that are set, usually the touch wirings 51 in the touch layer 50 are exchanged into an array layer to use a chip to perform display driving and touch driving simultaneously. At the same time, along a direction of a top view of the display panel 100, the touch wirings 51 is disposed between adjacent two of the sub-recesses 623. Because the sub-recesses 623 are disposed separately, it is only required that the interval between adjacent two of the sub-recesses 623 is guaranteed to allow the touch wirings 51 to pass through the interval.

In the display panel 100 of the present application, with reference to FIG. 4, in the barrier notches 62, along the second direction Y, a size of each of the barrier notches 62 can be equal, an interval between adjacent two of the barrier notches 62 can be equal.

In the display panel 100 of the present application, in the barrier notches 62, along the second direction Y, the size of each of the barrier notches 62 can be 40 microns, the interval between adjacent two of the barrier notches 62 can be 40 microns.

For example, the first recess 621, a size of the second recess 622 and a size of the sub-recess 623 along the second direction Y can be equal, the size can be 40 microns. Adjacent intervals among the first recess 621, the second recess 622, and the sub-recess 623 along the second direction Y can be equal, the interval can be 40 microns.

In the display panel 100 of the present application, along the second direction Y, a size of each of the barrier notches 62 is greater than a size of the first aperture 61. The present embodiment sets the sizes of the first recess 621, the second recess 622 and the sub-recess 623 along the second direction Y greater to be able to more effectively prevent ink in th process from flowing.

In the display panel 100 of the present application, with reference to FIG. 10, the non-display region 300 comprises a bending region 400 configured for bending. The barrier notches 62 is disposed between the display region 200 and the bending region 400. Because the bending region 400 of the display panel 100 corresponds to a lower frame of a final product, a position of the bending region 400 is equivalent to a position of the lower frame of the final product. The present embodiment disposes the barrier notches 62 between the display region 200 and the bending region 400, limits the cutoff boundary of the second refractive index between the display region 200 and the bending region 400 through the barrier notches 62 to achieve a narrow frame design.

In the present embodiment, two ends of the first type recess D1 extend to the boundary of the display panel 100 and contact the boundary of the display panel 100. With reference to FIG. 10, two ends of the first recess 621 and two ends of the second recess 622 can extend toward the boundary of the display panel 100 and contact the boundary of the display panel 100. Furthermore, a certain interval exists between the sub-recess 623 and the display panel 100.

The present application also sets forth a mobile terminal comprising a terminal main body and the above display panel. The terminal main body and the display panel are assembled integrally. The terminal main body can be bonded to a device of the display panel such as a circuit board and and covers a cover lid of the display panel. The mobile terminal can comprise an electronic apparatus such as cell phone, television, notebook, etc.

It can be understood that for a person of ordinary skill in the art, equivalent replacements or changes can be made according to the technical solution of the present application and its inventive concept, and all these changes or replacements should belong to the scope of protection of the appended claims of the present application.

What is claimed is:

1. A display panel, wherein the display panel comprises a display region and a non-display region located on at least one side of the display region; the display panel further comprises:
    a substrate;
    a light emitting layer disposed on a side of the substrate, wherein the light emitting layer comprises a plurality of light emitting pixels disposed in the display region;

a touch layer disposed on a side of the light emitting layer away from the substrate, wherein the touch layer comprises touch electrodes disposed in the display region and touch wirings electrically connected to the touch electrodes, and the touch wirings extend from the display region to the non-display region;

a first refractive index layer disposed on a side of the touch layer away from the substrate, wherein the first refractive index layer comprises a plurality of first apertures distributed in the display region and corresponding to the light emitting pixels;

a second refractive index layer disposed on a side of the first refractive index layer away from the substrate, filled in the first apertures, and a refractive index of the second refractive index layer is greater than a refractive index of the first refractive index layer;

wherein the first refractive index layer further comprises a plurality of barrier notches distributed in the non-display region and extending along a first direction, the barrier notches comprise a first type recess and a second type recess, the first type recess is disposed to cover the touch wirings, and the second type recess comprises at least one sub-recess not overlapping the touch wirings.

2. The display panel according to claim 1, wherein the display panel further comprises:

a driver circuit layer disposed between the substrate and the light emitting layer, wherein the driver circuit layer comprises a plurality of driver circuits electrically connected to corresponding ones of the light emitting pixels and driver wirings electrically connected to the driver circuits, and the driver wirings extend from the display region to the non-display region;

wherein the non-display region comprises a bending region and a wiring exchange region disposed between the bending region and the display region, wherein the touch wirings are electrically connected to the driver wirings through via holes in the wiring exchange region;

wherein a wiring exchange region is disposed between adjacent two of the sub-recesses.

3. The display panel according to claim 1, wherein an overlapped position between the first type recess and the touch wirings are filled with a covering portion.

4. The display panel according to claim 3, wherein the covering portion comprises a plurality of sub-covering portions at least covering one of the touch wirings.

5. The display panel according to claim 1, wherein a plurality of barrier sets are disposed in at least one of the barrier notches and are arranged along a second direction, and each of the barrier sets comprises a plurality of barrier bodies arranged along the first direction;

wherein the barrier bodies in adjacent two of the barrier sets are staggered, and an included angle range between the first direction and the second direction is 0° to 90°.

6. The display panel according to claim 5, wherein along a direction of a top view of the display panel, a shape of each of the barrier bodies is one of a square, a rhombus, and a circle.

7. The display panel according to claim 5, wherein in adjacent two of the barrier sets, a central interval between adjacent two of the barrier bodies is 6 microns to 9 microns.

8. The display panel according to claim 7, wherein a length of a diagonal line of the barrier bodies is 8 microns to 12 microns.

9. The display panel according to claim 8, wherein along the second direction, a size of each of the barrier notches is equal, and an interval between adjacent two of the barrier notches is equal.

10. The display panel according to claim 8, wherein along the second direction, a size of each of the barrier notches is 40 microns, and an interval between adjacent two of the barrier notches is 40 microns.

11. The display panel according to claim 8, wherein along the second direction, a size of each of the barrier notches is greater than a size of the first aperture.

12. The display panel according to claim 8, wherein the first type recess comprises a first recess and a second recess, the second type recess comprises the two sub-recesses separated from each other, the second recess is located between the first recess and the sub-recesses, the sub-recesses are located on a side of the second recess away from the display region, and the first recess is located on a side of the second recess near the display region.

13. The display panel according to claim 12, wherein a boundary of the second refractive index layer is located between the first apertures and the first recess.

14. The display panel according to claim 12, wherein a boundary of the second refractive index layer is located between the first recess and the second recess.

15. The display panel according to claim 12, wherein a boundary of the second refractive index layer is located between the sub-recesses and the second recess.

16. The display panel according to claim 12, wherein along the first direction, a size of each of the sub-recesses is 1000 microns to 2000 microns.

17. The display panel according to claim 12, wherein the first recess or the second recess comprises a first barrier segment and a second barrier segment, the first barrier segment is perpendicular to the second barrier segment, and an extension direction of the first barrier segment is parallel to the first direction.

18. The display panel according to claim 17, wherein along the first direction, an interval between the second barrier segment and the sub-recesses is 1000 microns to 2000 microns.

19. The display panel according to claim 12, wherein the first type recess is disposed between the display region and a bending region;

wherein two ends of the first type recess extend to a boundary of the display panel and contacts the boundary of the display panel.

20. A mobile terminal, wherein the mobile terminal comprises a terminal main body and the display panel according to claim 1, and the terminal main body and the display panel are assembled integrally.

* * * * *